United States Patent
Gerhart et al.

(10) Patent No.: US 10,423,525 B2
(45) Date of Patent: Sep. 24, 2019

(54) AUTOMATIC PERFORMANCE TUNING FOR MEMORY ARRANGEMENTS

(71) Applicant: Western Digital Technologies, Inc., San Jose, CA (US)

(72) Inventors: Darin Edward Gerhart, Oronoco, MN (US); Cory Lappi, Rochester, MN (US); Nicholas Edward Ortmeier, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/875,815

(22) Filed: Jan. 19, 2018

(65) Prior Publication Data

US 2019/0227920 A1    Jul. 25, 2019

(51) Int. Cl.
*G06F 12/00* (2006.01)
*G06F 12/02* (2006.01)
*G06F 3/06* (2006.01)
*G06F 11/34* (2006.01)

(52) U.S. Cl.
CPC .......... *G06F 12/0246* (2013.01); *G06F 3/061* (2013.01); *G06F 3/0604* (2013.01); *G06F 3/068* (2013.01); *G06F 3/0653* (2013.01); *G06F 3/0679* (2013.01); *G06F 11/3414* (2013.01); *G06F 11/3476* (2013.01)

(58) Field of Classification Search
None
See application file for complete search history.

(56) References Cited

U.S. PATENT DOCUMENTS

| | | | |
|---|---|---|---|
| 7,500,158 B1 * | 3/2009 | Smith | H04L 41/0853 709/220 |
| 9,432,298 B1 * | 8/2016 | Smith | H04L 49/9057 |
| 2016/0210074 A1 | 7/2016 | Gerhart | |
| 2017/0177241 A1 | 6/2017 | Erickson et al. | |

* cited by examiner

*Primary Examiner* — Baboucarr Faal
(74) *Attorney, Agent, or Firm* — Patterson & Sheridan, LLP; Steven H. VerSteeg

(57) ABSTRACT

An arrangement is disclosed comprising a memory arrangement configured to store and retrieve data; an interface to allow data to be received and transmitted by the arrangement from a host and a processor configured to dynamically conduct automatic performance tuning for the memory arrangement.

22 Claims, 6 Drawing Sheets

Fig. 3

WORKLOAD PERFORMANCE PROFILE MODE PAGE FORMAT

| BYTE | BIT 7 | 6 | 5 | 4 | 3 | 2 | 1 | 0 |
|---|---|---|---|---|---|---|---|---|
| 0 | PS | SPF = 1 | PAGE CODE = TBD (VENDOR UNIQUE SPACE) | | | | | |
| 1 | SUBPAGE CODE = TBD (VENDOR UNIQUE SPACE) | | | | | | | |
| 2 - 3 | PAGE LENGTH = n - 3 | | | | | | | |
| 4 - n | WORKLOAD PERFORMANCE PROFILE DESCRIPTORS (0 - x) | | | | | | | |

Fig. 4

WPPD FORMAT

| BYTE | BIT 7 | 6 | 5 | 4 | 3 | 2 | 1 | 0 |
|---|---|---|---|---|---|---|---|---|
| 0 | WORKLOAD ID | | | | | | | |
| 1 - 2 | QUEUE DEPTH | | | | | | | |
| 3 - 4 | TRANSFER LENGTH | | | | | | | |
| 5 - 7 | TARGET IOPs | | | | | | | |

| AUTO PERFORMANCE TUNING CONFIGURATION PARAMETERS | | | | | | | | |
|---|---|---|---|---|---|---|---|---|
| BYTE | BIT | | | | | | | |
| | 7 | 6 | 5 | 4 | 3 | 2 | 1 | 0 |
| 0 | ACTIVE | | | RESERVED | | | DEEP | ENABLE |
| 1 - 2 | WORKLOAD SETTLE TIME (s) | | | | | | | |
| 3 - 4 | SAMPLE COUNT | | | | | | | |
| 5 | DEVIATION TARGET | | | | | | | |

Fig. 5

AUTOMATIC PERFORMANCE TUNING FOR MEMORY ARRANGEMENTS

FIELD OF THE DISCLOSURE

Aspects of the disclosure relate to memory arrangements. More specifically, aspects relate to automatic performance tuning (APT) for memory arrangements, such as solid state drives for computers.

BACKGROUND INFORMATION

Field

Greater and greater demands are placed upon computers and computer related components as the needs for high performance computing increases. Increased performance is desired from the smallest of personal computer devices to high efficiency enterprise computer systems.

Overall computer performance is affected by the components that comprise a computer or that are configured to be attached to the computer system. Memory arrangements, such as solid state devices, hard disk drives and hybrid disk drives are used to store information that may be needed for future computer activities. When data is provided to the memory arrangement or device, stalling of computer activities may occur. The delays, called latency, can be significant for certain computer actions and there is a desire among computer users, designers and architects to limit the latency as much as possible.

As computers are dynamic devices, computers are called upon to do varying types of activities. Some activities may be considered relatively small, such as retrieving specific data from a memory arrangement. More complex actions, such as writing to a memory arrangement, can result in more significant latency. Write operations, therefore, may be scheduled at various times to lessen the interference with on-going computer operations as these types of operations take longer to perform.

Conventional computers, while they are dynamic devices, do not provide the ability to fine tune specific components of the computer for maximum efficiency. There is a need, therefore, to provide a memory arrangement or device that minimizes the latency that a user will experience.

There is an additional need to provide a memory device that may be dynamic in actions that are undertaken.

There is an additional need to provide a memory device that is not only dynamic in actions taken but that can also be provided with user inputs to achieve a desired level of efficiency and/or performance.

There is a still further need to provide an economical memory device that provides flexibility in efficiency and performance.

SUMMARY

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

In one non-limiting embodiment, an arrangement is disclosed comprising a memory arrangement configured to store and retrieve data; an interface to allow data to be received and transmitted by the arrangement from a host and a processor configured to dynamically conduct automatic performance tuning for the memory arrangement.

In another non-limiting embodiment, a method for altering a performance of a solid state drive is disclosed comprising: selecting at least one performance profile target; detecting a workload to be accomplished by the solid state drive, loading initial starting values for an automatic performance tuning algorithm, configuring a command performance statistics monitor to measure workload input and output performance, measuring performance of the solid state drive with the command performance statistics monitor, comparing the performance measurement of the solid state drive with the at least one performance profile target and adjusting performance of the solid state drive through the automatic performance tuning algorithm when the comparing of the performance measurement of the solid state drive with the at least one performance profile target indicates that the performance of the solid state drive is less than the at least one performance profile target.

In another non-limiting embodiment, an arrangement is disclosed comprising: means for selecting at least one performance profile target, means for detecting a workload to be accomplished by the solid state drive, means for loading initial starting values for an automatic performance tuning algorithm, means for configuring a command performance statistics monitor to measure workload input and output performance, means for measuring performance of the solid state drive with the command performance statistics monitor, means for comparing the performance measurement of the solid state drive with the at least one performance profile target and means for adjusting performance of the solid state drive through the automatic performance tuning algorithm when the comparing of the performance measurement of the solid state drive with the at least one performance profile target indicates that the performance of the solid state drive is less than the at least one performance profile target.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 is a workload performance profile mode page format diagram.

FIG. 4 is a workload performance profile descriptor format diagram.

FIG. 5 is an automatic performance tuning configuration parameter diagram.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
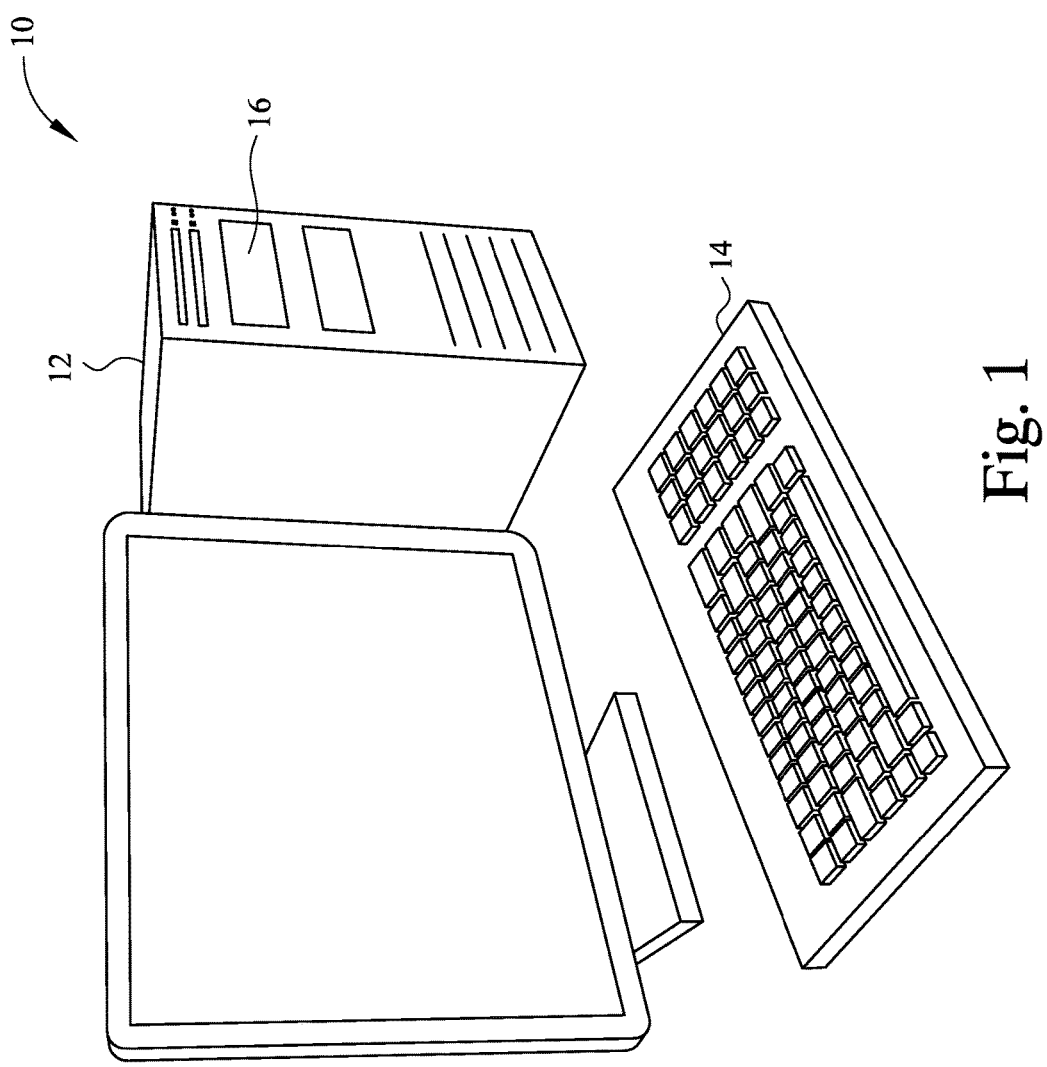
FIG. 1 is a schematic of a host and device interconnection.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

Aspects of the present disclosure relate to computer operations and computer storage and specifically, performing automatic performance tuning of storage devices that are connected to a computer host. In the embodiments described, a data storage arrangement is connected to the host system. The function of the data storage arrangement is to accept data and store the data until needed again by a user or the host. The data storage arrangement may be configured to accept bursts of data, depending on the computer process performed, therefore the data storage arrangement is configured with multiple memory units that provide for various states of usage. Certain sections of the data storage arrangement are configured with memory systems that provide for fast action (low latency) so that computer processes may be conducted at a rapid pace. Such low latency performance may be accomplished by single layer cell (SLC) memory configurations. If bulk amounts of data are required to be stored, multiple layer cell memory configurations may also be present, such as triple level cell (TLC) memory configurations. The data storage arrangement may have an interface that allows the data storage arrangement to connect with the host. The interface may be a Serial Attached SCSI (SAS) Interface or Serial ATA (SATA) compatible interface, as a non-limiting embodiments. The memory storage may have a configuration to allow for plug and play ability. Although described as having a SAS or SATA compatible interface, the memory storage device may be provided with a configuration which allows for access by wireless technology. In one non-limiting embodiment, 802.11ac technology may be used to provide for fast performance for smooth streaming. Wireless technology may use, for example, between 2.5 GHz to 5 GHz frequencies for connection. In some embodiments, the storage may allow users to choose the frequencies for wireless connection. While being described as SAS or SATA compatible, other types of interfaces may be used.

Auxiliary connections may be provided to the data storage arrangement to allow for additional options for inputting data directly to the data storage arrangement without interfacing with the host. Such direct input of data may be provided through placement of an integrated secure digital card to offload or copy data. Other auxiliary connections may be provided for additional input/output operations. Such connections may be USB 2.0, USB 3.0, Firewire or other hard wired configurations. Gigabit Ethernet interfaces and connections may also be used.

The data storage arrangement may be configured with a separate power supply or may be run through other power supply means, such as from a computer mother board. In some embodiments, an internal battery may be provided to power the data storage arrangement as an independent entity. Such configurations may be provided such that the data storage arrangement is a portable unit. In such data storage arrangement configurations, the power supply means may be sufficient to power a host and/or charge a host, such as a mobile cellular phone, personal computer, tablet, camera or other configuration. The data storage arrangement may also have a battery indicator to allow a user to understand the amount of charge in the data storage arrangement from a visual inspection. Such battery indicators may be, for example, low energy consumption light emitting diode technology. In specific embodiments, the data storage arrangement may be provided with a circuit to allow for charging and prevent overcharging of the system if the data storage arrangement is connected to an outside power supply for an extended period. In some embodiments, circuitry may be used to determine if a threshold of inactivity has been reached for the storage system, thereby causing the system to enter a low power consumption mode, conserving battery power.

In one non-limiting embodiment, a controller is provided to control actions of the data storage arrangement as required by the host. The controller may also be configured to perform maintenance activities for the data storage arrangement to allow for efficient use.

Internal software may be provided on the data storage arrangement to allow for efficient storage and read capability of data on the system. Such internal software may be used such that the data storage arrangement can be used as a portable media server to wirelessly stream media to a host or output device. Such output devices may include, but not be limited to, smart televisions, smart phones, or stereo audio systems. The internal software may also be provided such that the access of data may be performed by cloud applications designed for interface with the data storage arrangement.

The internal software of the data storage arrangement may also be configured to provide for security of the data storage arrangement. Safeguarding of material provided on the data storage arrangement prevents unauthorized access to sensitive information contained on the system. Such security may be in the form of password protection, such as a Wi-Fi password protection. In some embodiments, the data storage arrangement may be configured with software that allows the data storage arrangement to create a hardware lock. Such hardware locks may prevent access through a USB connection.

The internal software may also be capable of providing diagnostic support for users. In such configurations, two different modes may be provided. A quick test software program may be provided with the capability to check the data storage arrangement for major performance problems. A full test mode may also be provided to provide detailed status information to a user. Such status information may be, for example, the total amount of memory of the data storage arrangement, the amount of memory storage used, storage divisions provided on the data storage arrangement, firmware versions for the internal software, memory block errors and similar data. The internal software may also have the capability of accepting data to update the firmware of the internal software.

The internal software may also be used as a server system wherein in certain embodiments, Digital Living Network Alliance (DLNA) enabled software is incorporated. Such software allows for quick file transfer and error checked operation as a server. In some embodiments, the internal software may be provided with the capability to use file transfer protocol (FTP) to enable the transfer of content to and from the memory storage in public access folders. The data storage arrangement may also provide for either a secured login or an anonymous login capability.

In specific embodiments, the data storage arrangement may be configured such that the system interacts with cloud storage systems. In the event that the data storage arrangement approaches the limits of storage capability, the data storage arrangement may allow for some of the data to be stored on cloud based systems. Selection of the data to be stored on such external storage systems may be governed by the controller which is configured to determine what sections of data may be appropriately stored in cloud based systems to minimize latency for users. The storage system may have a unique identifier MAC address and device name to allow the system to operate on an independent basis. The storage system may also be operated in a configuration that allows for the system to clone a MAC address of a computer that is attached.

The overall capacity of the data storage arrangement may vary according to the different embodiments provided. Capacities 1 TB, 2 TB up to 64 TB may be provided, as non-limiting embodiments. Different form factors may also be provided. In the illustrated embodiment, a form factor of 2.5 inches is provided. Other form factors such as 1.8 inch or 3.5 inch may also be used. Compatibility of the data storage arrangement may be provided for Windows operating systems, Windows Server, Linux and Mac OS, as non-limiting embodiments. Example Windows operating systems that may use the system may be Windows 10, Windows 8 and Windows 7. Example Mac OS systems may be Lion (Mac OSA 10.7), Mountain Lion (Mac OS 10.8), Yosemite (Mac OS 10.10), El Capitan (Mac OS 10.11), Sierra and Mavericks as non-limiting embodiments. Supported browsers for the storage system may be, in non-limiting embodiments, Internet Explorer, Safari, Firefox and Google Chrome.

Software may also be included in the system to allow for quick and automatic backups of data according to user prescribed requirements. Such backup ability may be compliant with Windows based backup and restore functions and/or Apple Time Machine requirements. Furthermore, software may be provided to add more than one user to the storage system. Users can be added or deleted according to an administration account. Such administration account may also allow for restricted access for certain users according to administration requirements.

Aspects presented herein describe techniques for performing automatic performance tuning of a memory arrangement, such as a solid state drive. As provided above, a data storage device may be connected to a computer through a hard wire connection or through a wireless connection. A controller included with the data storage device may be configured to control functions of the drive and record timestamps associated with events while executing commands. The controller may include circuitry that is configured to record data, in various forms, to allow the drive to alter performance based upon the data recorded. The data that is provided includes details regarding what types of operations are needed to be accomplished, (e.g. write or read commands), how long those commands need to be accomplished, and what types of workloads are necessary to be accomplished. The controller may be configured to determine total elapsed time between any timestamps and record information about the operating characteristics of the drive.

The drive may also be configured to review operations that have occurred and fine tune operations to provide the best operational modes needed for the user. Parameters that may affect the overall characteristics of the drive may be needed latency, available power, etc. The techniques of this disclosure allow for an automatic performance tuning of the drive based upon an algorithm. The algorithm may review data that is placed in various configurations, thereby instructing the future operations of the drive. Data may be inserted into mode page format for reading by the algorithm. The mode pages may be modified, for example by a host, to allow automatic performance tuning to be accomplished and to what degree and extent the operations will be performed.

In aspects provided, a user or host may provide an input to a computing arrangement and consequently, a memory arrangement. The memory arrangement, and an associated controller, may accept this data and act according to the data received. For clarity, a device, as described herein, is a memory arrangement that may accept, store and retrieve data, such as, for example, a solid state drive. The input may contain information that is placed in mode page format. In one non-limiting embodiment, the data may be a performance profile that the device should match in a workload performance profile mode page. Advantages of such actions would allow a user the ability to take drives from different manufacturing origins and allow the drives to operate at a similar level, despite having different manufacturing tolerances and capabilities. The specific data utilized may also allow for performance enhancements of a computer system using such an equipped device. In certain non-limiting embodiments, the user may directly enter a workload performance profile descriptor. In other embodiments, the user may enter data that may be placed into the workload performance profile descriptor.

In non-limiting embodiments, the workload performance profile descriptor consists of a workload identifier (WID), a queue depth (QD), transfer length and target input/output per second (IOPS). In other embodiments, a user may be provided more control to configure the automatic performance tuning configuration mode parameter. The automatic performance tuning configuration mode parameter may be used, for example, to configure an automatic performance tuning algorithm.

In one non-limiting embodiment, a device may load an initial value for a performance profile descriptor. The initial value may be a factory preset value that allows for performance based upon a best guess estimate by the manufacturer on what types of workloads will be encountered. The automatic performance tuning algorithm, however, may dynamically change operating characteristics to more closely match needed operational capabilities. As a non-limiting example, the device may be configured to determine an amount and type of workload assigned to the device. After the determination of the amount and type of workload to be assigned to the device, the device may load a user desired performance profile to best match the workload. The loading may occur, for example, through an interface between the computer and the device. The device may use a command performance statistics monitor (CPSM) to measure and log performance of an existing workload.

In aspects described, the device may compare performance measurements of the current operations of the drive to a desired workflow. If the device compares performance expectations of what is desired and what can be completed with the current drive settings and the anticipated performance of the device is adequate with those settings, then performance may continue for the device. If the performance measurements are not what is desired, the performance may be subject to automatic performance tuning so that the device exceeds the needed performance or comes as close as possible to the desired expectations for performance. The performance tuning parameters may be altered to reduce deviation from a desired or target workload performance. The performance may then be newly monitored and the performance tuning parameters may be continually adjusted to achieve the target workload performance.

In embodiments, the device may analyze data logs to determine optimal adjustments to align with anticipated or active workloads. Performance measurements may be logged at each set of performance tuning parameters for iterations during automatic performance tuning. In embodiments, for example, following automatic performance tuning completion for a workload, log entries may be further assessed to determine if adjustments should be made to the controls and the automatic performance tuning algorithm to converge on desired target performance targets faster in future tuning cycles.

Performance tuning log data may be returned as part of telemetry data or standard log dumps. In some embodiments, large number of logs from healthy field drives would provide good data sources for deep learning on automatic performance tuning points. Deep learning assessments may provide data-based refinement to the automatic performance tuning algorithm and initial performance tuning parameter starting points.

Regarding FIG. 1, an illustration of a host and device configuration 10 is provided. The host 12 is a computer that is provided with an interface 14 to allow a user to interact with the host 12. The interface 14 may be a keyboard and monitor system as a non-limiting embodiment. The host 12 provides a computing arrangement that allows for input, retention and output of information, as desired, from the request of a user. The device 16, is an arrangement that provides for retention of information. In the illustrated embodiment, the device 16 is a non-volatile memory device, such as a NAND flash unit. The device 16 may have a host interface which is configured to interface with the host 12 to allow the device 16 to be addressable by the host 12.

The host 12 may have several configurations and the illustration provided is but one example embodiment. The host 12 may have a serial port, a parallel port, a fire-wire connection, Ethernet connection and/or multiple universal serial bus devices (USB's). The host 12 may have a processor that allows for computation of required processes. Video output may be provided such that a user can identify the results of processor actions. The output may be through a connected universal serial bus device or dedicated video output, through, for example, a video card and video monitor. The host 12 may also be provided with a printer output port to allow for printed output of the materials calculated.

The host 12 may also be provided with other input/output devices, such as a mouse, camera or other similar components. In the non-limiting embodiment, the host 16 is configured as a stand-alone unit. Such a stand-alone unit may be a laptop computer or may be a desktop computer unit. The host 12 may also be provided with an additive connection feature, such as a server/rack system. The host 12 may be one component in such a server and rack system.

The host 12 may be configured such that it is self-powered and can provide power to the other components attached to the host 12. In the illustrated embodiment, the host 12 is configured with the ability to provide power to the device 16.

Figure 2:
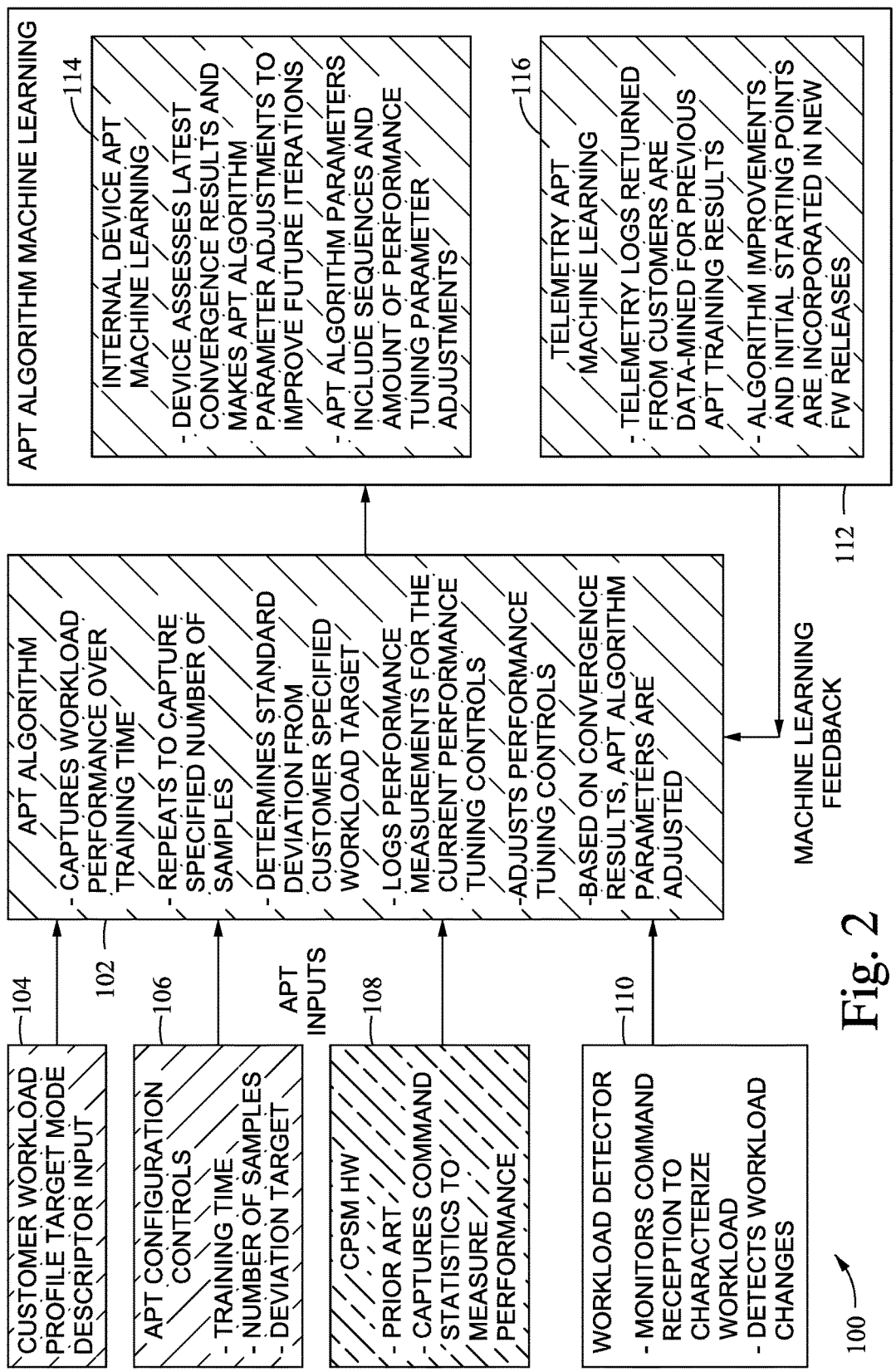
FIG. 2 is a block diagram of an automatic performance tuning diagram.

Referring to FIG. 2, an automatic performance tuning block diagram 100 is illustrated. An automatic performance tuning algorithm 102 is provided. Such an algorithm may be operable on, for example, by a processor that may be located within a storage device (i.e. solid state drive) as a non-limiting embodiment. The automatic performance tuning algorithm 102 is configured to be read by the processor and have instructions to be generated to modify operations of the storage device. Specific inputs are provided to the automatic performance tuning algorithm 102 that may also be used by the processor. In the non-limiting embodiment, a customer workload profile target mode descriptor 104 is input to the automatic performance tuning algorithm 102. Automatic performance tuning configuration controls 106 may also be input to the automatic performance tuning algorithm 102. The automatic performance tuning configuration controls 106 may be input and provide a training time as well as a number of samples of data to be taken and any deviation target values for the automatic performance tuning algorithm 102. CSPM hardware may also provide inputs 108 to the automatic performance tuning algorithm 102, such as captured command statistics to measure performance. Workload detector 110 may monitor command reception from the host to characterize workloads and detect workload changes. The automatic performance tuning algorithm 102 is configured to capture data related to workload performance over a training time to enable the storage device to be trained for efficiency, as needed. The training may be done at a manufacturing site, or may be done at various times throughout the life of the storage device. Running of the automatic performance tuning algorithm 102 may be repeated as often as necessary to capture different samples. The automatic performance tuning algorithm 102 may also be configured to log performance measurements with respect to current performance tuning control levels for future analysis.

In embodiments, the automatic performance tuning algorithm 102 may use machine learning capabilities to provide for tuning capabilities for help in tuning over time and to help with differing computer installations. The device may assess the latest convergence results of previous algorithm runs and make automatic performance tuning algorithm parameter adjustments to improve future iterations. The automatic performance tuning algorithm parameters may include sequences and an amount of performance tuning parameter adjustments 114.

Telemetry automatic performance tuning machine learning 116 is also used. Telemetry logs may be used and data mined for automatic performance tuning algorithm training results. Algorithm improvements and initial starting points may be incorporated in future firmware revisions.

Referring to FIG. 3, a workload performance profile mode page format is illustrated. The data in the mode page provides an indication on what activities should be accomplished by the overall drive. In the illustrated embodiment, a host may update values in the mode page. When activities are necessary to be accomplished, the device reads the values in the mode page and performs according to the instructions (data) provided therein. In the illustrated embodiment, bit values extend from 0 through 7 and byte values, the "y" axis of the figure, extends from value 0 to greater than value 4. Page code and subpage codes are provided along bytes 0 and 1 respectively and may be unique to each vendor product allowing differing manufacturers to identify their respective equipment. A page length field is located along bytes 2 and 3 to describe the length of the subsequence workload performance profile descriptors included in the mode page. A workload performance profile descriptor, used by the automatic performance tuning algorithm, is located in bytes 4 to n and along the entire bit range described.

Referring to FIG. 4, the workload performance profile descriptor (WPPD) format is provided. Such descriptors are identified with bytes greater than or equal to 4 in FIG. 3. In this embodiment, the workload performance profile descriptor consists of four specific values: a Workload identification value (Workload ID), a Queue depth, a transfer length, and a target IOPS. The workload ID aligns to a specific workload that the workload detection arrangement can detect. As a non-limiting embodiment, example values of the workload ID value are: a full volume random read=0, full volume random write=2, partial volume write=3 and 30% random read 70% random write=4. Such values and their respective meanings may be altered and as such, the examples should be considered non-limiting.

A queue depth value extends along bytes 1 and 2. The queue depth value described is equal to the number of outstanding commands on the drive. A transfer length is also provided for the workload performance profile descriptor. The transfer length is located along bytes 3 and 4 and is defined as the number of blocks transferred for each command. A target IOPs value is further provided in the workload performance profile mode page format along bytes 5 to 7. The target IOPs value relates to host specified I/O per second that are provided and that the device should attempt to match for that workload. The data in the workload performance profile descriptor, therefore, may be read by the algorithm with the algorithm subsequently modifying the drive parameters. In the instance that a workload is provided by a host to the drive, wherein the workload does not match the workload performance profile descriptor, then the drive may revert to a default performance. As a non-limiting embodiment, the drive may enter a maximum performance mode to accomplish tasks with as little latency as possible.

Referring to FIG. 5, an automatic performance tuning configuration mode parameter is illustrated. This parameter allows a host to configure an amount of time for automatic performance tuning and a level of desired accuracy for the automatic performance tuning. An enable bit is used to enable or disable automatic performance tuning, therefore differing values, when read by processor using the algorithm, will cause different functions. In a non-limiting embodiment, a value of 0, for example, would disable automatic performance tuning. A value of 1 would enable automatic performance tuning and results in automatic performance tuning from initializing training algorithms. The enable bit is located along byte 0, at bit 0.

A deep learning mode parameter is also provided. The deep learning mode parameter resets a machine learning initial starting point and search algorithm adjustments to enable extensive characterization. The deep learning mode is provided to allow for significant amounts of time to perform characterizing of performance tuning adjustments. The deep learning mode parameter is located along byte 0, bit 1.

A status bit is provided along byte 0 and bit 7, as provided in FIG. 4. This read-only bit is configured to reflect current automatic performance tuning status where a value of 0 indicates that automatic performance tuning is not performing tuning to a specific workload and a value of 1 indicates that automatic performance tuning has detected a workload with a valid workload performance profile descriptor and is actively tuning performance to align with the performance target for that workload. The bit provides the host with an indication of when the automatic performance tuning has converged on a performance target for a specific workload to allow the host to either disable automatic performance tuning or switch to a different workload.

A workload detection settle time value is provided. This value relates to the time the automatic performance tuning should spend monitoring workloads or measuring a device performance. The value is located along bytes 1 and 2.

A sample count value is provided so that when sampling, a minimum number of values are retained before any automatic performance tuning occurs. Such values prevent spurious data from being created by the algorithm, ensuring that a sufficient sample size is attained. The sample count value is located along bytes 3 and 4.

A deviation target value is provided as an input to automatic performance tuning algorithm to specify the desired deviation between the measured value and the Target IOPS specified in the workload performance profile descriptor. This deviation could be specified as standard deviation, percent difference, or some other variance measurement technique. These examples should be considered non-limiting. The deviation target is located in byte 5.

Figure 6A:
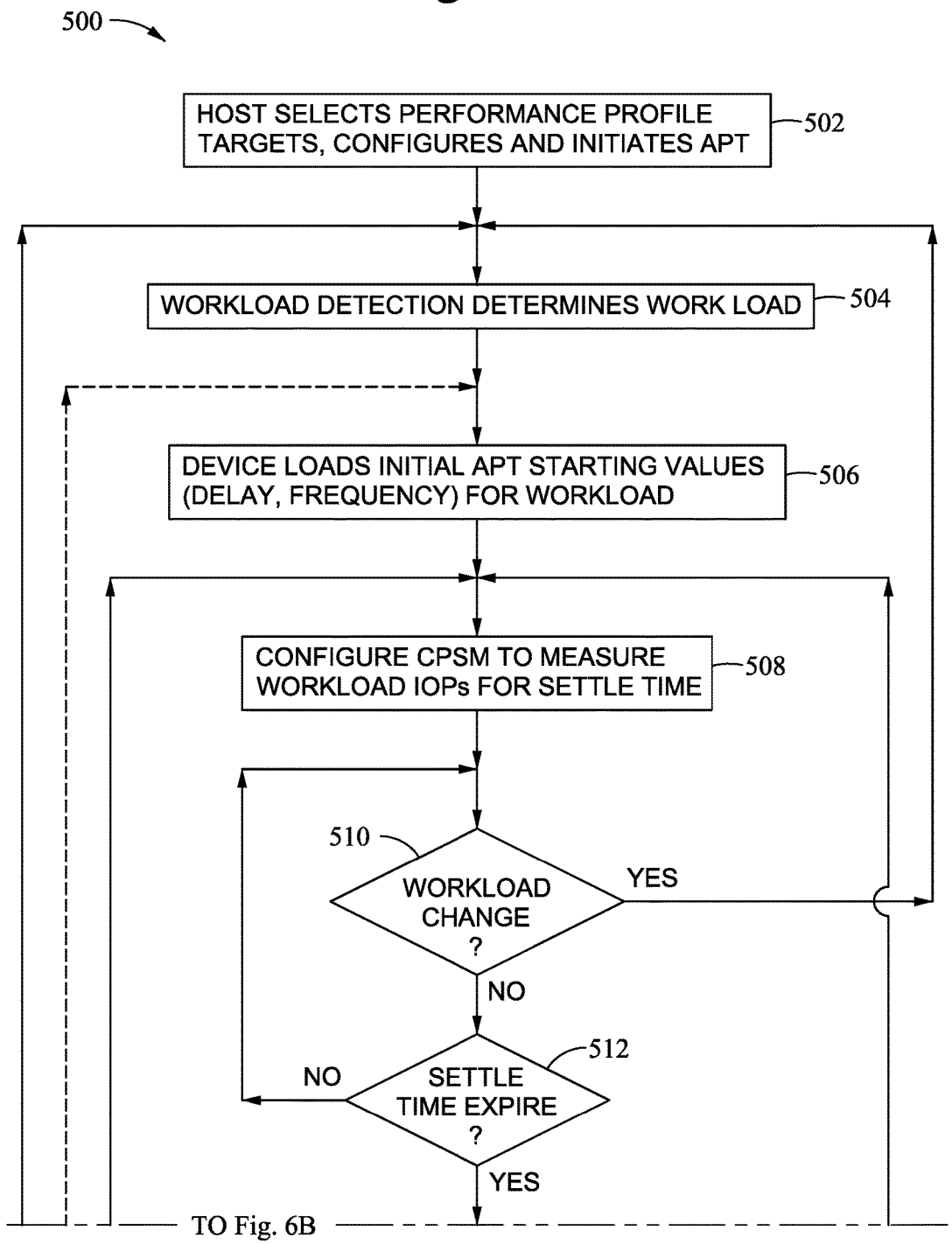
FIGS. 6A and 6B are an automatic performance tuning flow diagram.
Figure 6B:
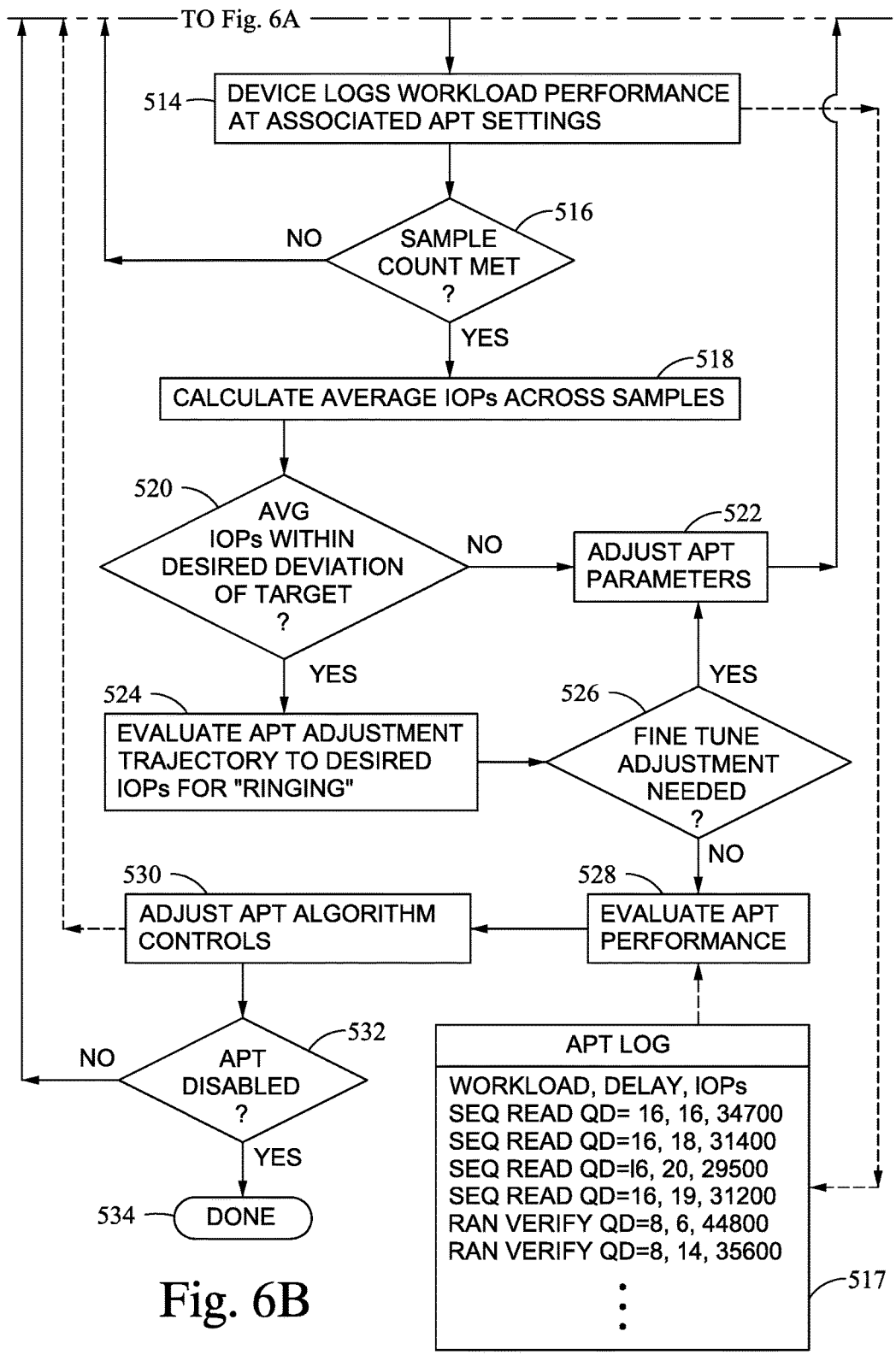

Referring to FIGS. 6A and 6B, an automatic performance tuning method 500 flowchart is illustrated. At 502 a host selects performance profile targets, configures and initiates automatic performance tuning. At 504, a workload detection arrangement determines a workload. At 506, the device loads initial automatic performance tuning starting values. Such values may include a delay and frequency for the workload. At 508, the CPSM may be configured to measure workload IOPs for settle time. At 510, a query is run to determine if there is a workload change. If there is no workload change at 510 then a query is run at 512 to determine if a settle time has expired. If there is a workload change at 510 then the method loops back to 504. If the settle time has not expired, then the method returns to the query at 510. If the settle time has expired at 512, then the device logs workload performance, as shown by the APT log 517, at associated automatic performance tuning settings at 514. The method then proceeds to a query at 516 wherein it is determined if a sample count has been met. If the sample count has not been met, the method returns to 508.

If the sample count has been met at 516 then an average IOPs across samples may be calculated at 518. The method then proceeds to a query at 520 wherein it is determined if the average IOPs within a desired deviation of a target. If the average IOPs are not within the desired deviation of the target, the automatic performance tuning parameters may be adjusted at 522 with the method returning to 508. If the query at 520 is true, then, at 524 the automatic performance tuning adjustment trajectory is evaluated to a desired IOPS for "ringing". The method proceeds to 526 wherein a query is run to determine if fine tuning adjustments are needed. If fine tuning adjustments are needed at 526 then the method returns to 522. If no fine tuning adjustments are needed at 526, then at 528 automatic performance tuning is evaluated using the APT Log information 517 that was previously recorded during 514. Next, at 530, automatic performance tuning algorithm controls are adjusted. Machine learning feedback is provided back to 506. The method continues to 532 where a query is performed to determine if automatic performance tuning is required to be disabled. If automatic performance tuning is not needed to be disabled, then the method continues to 504. If automatic performance tuning is needed to be disabled, then the method ends at 534.

In one non-limiting embodiment, an arrangement is disclosed comprising a memory arrangement configured to store and retrieve data, an interface to allow data to be received and transmitted by the arrangement from a host and a processor configured to dynamically conduct automatic performance tuning for the memory arrangement.

In another non-limiting embodiment, the arrangement is disclosed wherein the processor is configured to dynamically conduct automatic performance tuning through an algorithm.

In another non-limiting embodiment, the arrangement may further comprise a workload detector configured to monitor a command reception from a host to characterize a workload.

In another non-limiting embodiment, the arrangement may further comprise a command performance statistics monitor configured to capture command statistics to measure a performance of the arrangement.

In another non-limiting embodiment, the memory arrangement may be a solid state drive.

In another non-limiting embodiment, the memory arrangement may be a hybrid disk dive.

In another non-limiting embodiment, the arrangement may be configured wherein the host is one of a computer and a server.

In another non-limiting embodiment, a method for altering a performance of a solid state drive is disclosed comprising: selecting at least one performance profile target, detecting a workload to be accomplished by the solid state drive, loading initial starting values for an automatic performance tuning algorithm, configuring a command performance statistics monitor to measure workload input and output performance, measuring performance of the solid state drive with the command performance statistics monitor, comparing the performance measurement of the solid state drive with the at least one performance profile target and adjusting performance of the solid state drive through the automatic performance tuning algorithm when the comparing of the performance measurement of the solid state drive with the at least one performance profile target indicates that the performance of the solid state drive is less than the at least one performance profile target.

In another non-limiting embodiment, the method may be accomplished wherein the selecting the at least one performance profile target is through a host.

In another non-limiting embodiment, the method may be accomplished wherein the selecting the host is one of a computer and a server.

In another non-limiting embodiment, the method may be accomplished wherein the detecting of the workload is performed by a workload detector.

In another non-limiting embodiment, the method may be accomplished wherein the selecting the at least one performance profile target is an average input and output performance measurement.

In another non-limiting embodiment, the method may be accomplished wherein the measuring performance of the solid state drive with the command performance statistics monitor determines an average input and output performance measurement.

In another non-limiting embodiment, the method may further comprise determining if the measured performance of the solid state drive input and output performance measurement is within a desired threshold of the average input and output performance measurement profile target.

In another non-limiting embodiment, the method may further comprise adjusting parameters of the automatic performance tuning algorithm when the measured performance of the solid state drive input and output performance measurement is not within the desired threshold of the average input and output performance measurement profile target.

In another non-limiting embodiment, the method may further comprise fine tuning the automatic performance tuning when the measured performance of the solid state drive input and output performance measurement is within the desired threshold of the average input and output performance measurements profile target.

In another non-limiting embodiment, the method may further comprise disabling the automatic performance tuning algorithm.

In another non-limiting embodiment, the method may further comprise evaluating automatic performance tuning performance for at least one parameter compared to a threshold.

In another non-limiting embodiment, an arrangement is disclosed comprising means for selecting at least one performance profile target, means for detecting a workload to be accomplished by the solid state drive, means for loading initial starting values for an automatic performance tuning algorithm, means for configuring a command performance statistics monitor to measure workload input and output performance, means for measuring performance of the solid state drive with the command performance statistics monitor, means for comparing the performance measurement of the solid state drive with the at least one performance profile target; and means for adjusting performance of the solid state drive through the automatic performance tuning algorithm when the comparing of the performance measurement of the solid state drive with the at least one performance profile target indicates that the performance of the solid state drive is less than the at least one performance profile target.

In another non-limiting embodiment, the arrangement may further comprise means for adjusting parameters of the automatic performance tuning algorithm when the measured performance of the solid state drive input and output performance operations is not within the desired threshold of the average input and output performance operations profile target.

In another non-limiting embodiment, a method is disclosed comprising selecting at least one performance profile target, detecting a workload to be accomplished by the solid state drive, loading initial starting values for an automatic performance tuning algorithm, the initial starting values obtained from an automatic performance tuning log, configuring a command performance statistics monitor to measure workload input and output performance, measuring performance of the solid state drive with the command performance statistics monitor, comparing the performance measurement of the solid state drive with the at least one performance profile target and adjusting performance of the solid state drive through the automatic performance tuning algorithm when the comparing of the performance measurement of the solid state drive with the at least one performance profile target indicates that the performance of the solid state drive is less than the at least one performance profile target.

In another non-limiting embodiment, the method may further comprise generating a second automatic performance tuning log.

In another non-limiting embodiment, the method may be accomplished wherein the loading of the initial starting values for the automatic performance tuning algorithm obtained from the automatic performance tuning log is from the second automatic performance tuning log.

While embodiments have been described herein, those skilled in the art, having benefit of this disclosure will appreciate that other embodiments are envisioned that do not depart from the inventive scope of the present application. Accordingly, the scope of the present claims or any subsequent related claims shall not be unduly limited by the description of the embodiments described herein.

What is claimed is:

1. An arrangement, comprising:
   a non-stacked memory arrangement for a solid state drive configured to store and retrieve data, wherein the solid state drive has a workload performance profile mode page;
   an interface to allow data to be received and transmitted by the arrangement from a host; and
   a processor configured to dynamically conduct automatic performance tuning for the memory arrangement, wherein the automatic performance tuning uses an automatic performance tuning configuration mode parameter and the workload performance profile mode page and a deep learning mode bit configured to reset a machine learning initial starting point and search algorithm adjustments to enable characterization.

2. The arrangement according to claim 1, wherein the processor is configured to dynamically conduct the automatic performance tuning through an algorithm.

3. The arrangement according to claim 1, further comprising:
   a workload detector configured to monitor a command reception from a host to characterize a workload, the workload detector configured to use the workload performance profile mode page.

4. The arrangement according to claim 1, further comprising:
   a command performance statistics monitor configured to capture command statistics to measure a performance of the arrangement.

5. The arrangement according to claim 1, wherein the memory arrangement is a portion of a hybrid disk dive.

6. The arrangement according to claim 1, wherein the host is one of a computer and a server.

7. A method for altering a performance of a solid state drive, comprising:
   selecting at least one performance profile target;
   detecting a workload to be accomplished by the solid state drive by using a workload performance profile mode page;
   loading initial starting values for an automatic performance tuning algorithm using an automatic performance tuning configuration mode parameter;
   configuring a command performance statistics monitor to measure workload input and output performance;
   measuring performance of the solid state drive with the command performance statistics monitor;
   comparing the performance measurement of the solid state drive with the at least one performance profile target; and
   adjusting performance of the solid state drive through the automatic performance tuning algorithm when the comparing of the performance measurement of the solid state drive with the at least one performance profile target indicates that the performance of the solid state drive is less than the at least one performance profile target.

8. The method according to claim 7, wherein the selecting the at least one performance profile target is through a host.

9. The method according to claim 8, wherein the selecting the host is one of a computer and a server.

10. The method according to claim 7, wherein the detecting of the workload is performed by a workload detector.

11. The method according to claim 7, wherein the selecting the at least one performance profile target is an average input and output performance operations.

12. The method according to claim 11, wherein the measuring performance of the solid state drive with the command performance statistics monitor determines an average input and output performance operations.

13. The method according to claim 12, further comprising:
    determining if the measured performance of the solid state drive input and output performance operations is within a desired threshold of the average input and output performance operations profile target.

14. The method according to claim 13, further comprising:
    adjusting parameters of the automatic performance tuning algorithm when the measured performance of the solid state drive input and output performance operations is not within the desired threshold of the average input and output performance operations profile target.

15. The method according to claim 13, further comprising:
    fine tuning the automatic performance tuning when the measured performance of the solid state drive input and output performance operations is within the desired threshold of the average input and output performance operations profile target.

16. The method according to claim 15, further comprising:
    disabling the automatic performance tuning algorithm.

17. The method according to claim 13, further comprising:
    evaluating automatic performance tuning performance for at least one parameter compared to a threshold.

18. An arrangement, comprising:
    means for selecting at least one performance profile target;
    means for detecting a workload to be accomplished by the solid state drive;
    means for loading initial starting values for an automatic performance tuning algorithm;
    means for configuring a command performance statistics monitor to measure workload input and output performance;
    means for measuring performance of the solid state drive with the command performance statistics monitor;
    means for comparing the performance measurement of the solid state drive with the at least one performance profile target; and
    means for adjusting performance of the solid state drive through the automatic performance tuning algorithm when the comparing of the performance measurement of the solid state drive with the at least one performance profile target indicates that the performance of the solid state drive is less than the at least one performance profile target wherein the automatic performance tuning uses an automatic performance tuning configuration mode parameter and the workload performance profile mode page and a deep learning mode bit.

19. The arrangement according to claim 18, further comprising:
    means for adjusting parameters of the automatic performance tuning algorithm when the measured performance of the solid state drive input and output performance operations is not within the desired threshold of the average input and output performance operations profile target.

20. A method, comprising:

selecting at least one performance profile target;

detecting a workload to be accomplished by the solid state drive;

loading initial starting values for an automatic performance tuning algorithm, the initial starting values obtained from an automatic performance tuning log;

configuring a command performance statistics monitor to measure workload input and output performance;

measuring performance of the solid state drive with the command performance statistics monitor;

comparing the performance measurement of the solid state drive with the at least one performance profile target; and adjusting performance of the solid state drive through the automatic performance tuning algorithm when the comparing of the performance measurement of the solid state drive with the at least one performance profile target indicates that the performance of the solid state drive is less than the at least one performance profile target wherein the automatic performance tuning uses an automatic performance tuning configuration mode parameter and the workload performance profile mode page and a deep learning mode bit.

21. The method according to claim 20, further comprising:

generating a second automatic performance tuning log.

22. The method according to claim 21, wherein the loading of the initial starting values for the automatic performance tuning algorithm obtained from the automatic performance tuning log is from the second automatic performance tuning log.

* * * * *